(12) United States Patent
Chan et al.

(10) Patent No.: US 12,118,447 B2
(45) Date of Patent: *Oct. 15, 2024

(54) MODEL INTERPRETATION

(71) Applicant: H2O.ai Inc., Mountain View, CA (US)

(72) Inventors: Mark Chan, San Jose, CA (US);
Navdeep Gill, San Jose, CA (US);
Patrick Hall, Washington, DC (US)

(73) Assignee: H2O.ai Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,972

(22) Filed: Apr. 21, 2023

(65) Prior Publication Data
US 2024/0005218 A1    Jan. 4, 2024

Related U.S. Application Data

(63) Continuation of application No. 15/959,040, filed on Apr. 20, 2018, now Pat. No. 11,922,283.

(51) Int. Cl.
| | |
|---|---|
| *G06N 20/20* | (2019.01) |
| *G06F 18/23213* | (2023.01) |
| *G06F 18/243* | (2023.01) |
| *G06N 7/01* | (2023.01) |
| *G06N 20/00* | (2019.01) |

(52) U.S. Cl.
CPC ....... *G06N 20/20* (2019.01); *G06F 18/23213* (2023.01); *G06F 18/24323* (2023.01); *G06N 7/01* (2023.01); *G06N 20/00* (2019.01)

(58) Field of Classification Search
CPC .......... G06N 20/20; G06N 7/01; G06N 20/00; G06F 18/23213; G06F 18/24323
See application file for complete search history.

(56) References Cited

U.S. PATENT DOCUMENTS

| | | | |
|---|---|---|---|
| 5,508,718 | A | 4/1996 | Haikin |
| 5,550,971 | A | 8/1996 | Brunner |
| 5,604,860 | A | 2/1997 | McLaughlin |
| 5,611,059 | A | 3/1997 | Benton |
| 5,673,401 | A | 9/1997 | Volk |
| 5,726,883 | A | 3/1998 | Levine |
| 5,754,174 | A | 5/1998 | Carpenter |
| 5,832,496 | A | 11/1998 | Anand |
| 5,870,088 | A | 2/1999 | Washington |
| 5,956,024 | A | 9/1999 | Strickland |

(Continued)

FOREIGN PATENT DOCUMENTS

CN    107329887 A    11/2017

OTHER PUBLICATIONS

Chen, Lin, and Richi Nayak. "A reciprocal collaborative method using relevance feedback and feature importance." 2013 IEEE/WIC/ACM International Joint Conferences on Web Intelligence (WI) and Intelligent Agent Technologies (IAT). vol. 1. IEEE, 2013. (Year: 2013).*

(Continued)

*Primary Examiner* — Kakali Chaki
*Assistant Examiner* — Michael H Hoang
(74) *Attorney, Agent, or Firm* — Van Pelt, Yi & James LLP

(57) ABSTRACT

An indication of a selection of an entry associated with a machine learning model is received. One or more interpretation views associated with one or more machine learning models are dynamically updated based on the selected entry.

20 Claims, 13 Drawing Sheets

(56) References Cited

U.S. PATENT DOCUMENTS

| | | |
|---|---|---|
| 6,014,138 A | 1/2000 | Cain |
| 6,137,485 A | 10/2000 | Kawai |
| 6,144,962 A | 11/2000 | Weinberg |
| 6,199,099 B1 | 3/2001 | Gershman |
| 6,212,524 B1 | 4/2001 | Weissman |
| 6,222,540 B1 | 4/2001 | Sacerdoti |
| 6,275,225 B1 | 8/2001 | Rangarajan |
| 6,330,007 B1 | 12/2001 | Isreal |
| 6,353,446 B1 | 3/2002 | Vaughn |
| 6,356,905 B1 | 3/2002 | Gershman |
| 6,377,993 B1 | 4/2002 | Brandt |
| 6,601,233 B1 | 7/2003 | Underwood |
| 6,621,508 B1 | 9/2003 | Shiraishi |
| 6,643,661 B2 | 11/2003 | Polizzi |
| 6,668,253 B1 | 12/2003 | Thompson |
| 6,678,634 B1 | 1/2004 | Wendt |
| 6,714,219 B2 | 3/2004 | Lindhorst |
| 6,748,394 B2 | 6/2004 | Shah |
| 6,757,681 B1 | 6/2004 | Bertram |
| 6,792,475 B1 | 9/2004 | Arcuri |
| 6,832,263 B2 | 12/2004 | Polizzi |
| 6,889,096 B2 | 5/2005 | Spriggs |
| 6,895,409 B2 | 5/2005 | Uluakar |
| 6,918,091 B2 | 7/2005 | Leavitt |
| 6,941,311 B2 | 9/2005 | Shah |
| 6,947,929 B2 | 9/2005 | Bruce |
| 6,990,520 B2 | 1/2006 | Green |
| 7,007,029 B1 | 2/2006 | Chen |
| 7,030,890 B1 | 4/2006 | Jouet |
| 7,228,187 B2 | 6/2007 | Pavel |
| 10,496,905 B2 | 12/2019 | Solomon |
| 10,529,137 B1 | 1/2020 | Black |
| 10,692,089 B2 | 6/2020 | Zhang |
| 2002/0054141 A1 | 5/2002 | Yen |
| 2002/0095651 A1 | 7/2002 | Kumar |
| 2002/0123915 A1 | 9/2002 | Denning |
| 2002/0138158 A1 | 9/2002 | Andreth |
| 2002/0138527 A1 | 9/2002 | Bell |
| 2002/0186257 A1 | 12/2002 | Cadiz |
| 2003/0020671 A1 | 1/2003 | Santoro |
| 2003/0023468 A1 | 1/2003 | Aurrichio |
| 2003/0030664 A1 | 2/2003 | Parry |
| 2003/0120711 A1 | 6/2003 | Katz |
| 2003/0164862 A1 | 9/2003 | Cadiz |
| 2003/0212520 A1 | 11/2003 | Campos |
| 2003/0233367 A1 | 12/2003 | Uluakar |
| 2004/0015783 A1 | 1/2004 | Lennon |
| 2004/0075677 A1 | 4/2004 | Loyall |
| 2004/0181543 A1 | 9/2004 | Wu |
| 2004/0205287 A1 | 10/2004 | Joder |
| 2004/0225955 A1 | 11/2004 | Ly |
| 2005/0015745 A1 | 1/2005 | Wain |
| 2005/0022160 A1 | 1/2005 | Uluakar |
| 2005/0050095 A1 | 3/2005 | Hurtis |
| 2005/0054381 A1 | 3/2005 | Lee |
| 2005/0069107 A1 | 3/2005 | Tanaka |
| 2005/0071305 A1 | 3/2005 | Hugh |
| 2005/0143138 A1 | 6/2005 | Lee |
| 2006/0020942 A1 | 1/2006 | Ly |
| 2006/0156246 A1 | 7/2006 | Williams |
| 2011/0024125 A1 | 2/2011 | Wallace |
| 2013/0096898 A1 | 4/2013 | Usadi |
| 2013/0290106 A1 | 10/2013 | Bradley |
| 2014/0222349 A1 | 8/2014 | Higgins |
| 2014/0223462 A1 | 8/2014 | Aimone |
| 2014/0358475 A1 | 12/2014 | Boulkenafed |
| 2015/0019569 A1 | 1/2015 | Parker |
| 2015/0379429 A1 | 12/2015 | Lee |
| 2016/0092793 A1 | 3/2016 | Garrow |
| 2016/0170998 A1 | 6/2016 | Frank |
| 2017/0004260 A1 | 1/2017 | Moturu |
| 2017/0235848 A1 | 8/2017 | Van Dusen |
| 2017/0300933 A1 | 10/2017 | Mascaro |
| 2018/0018590 A1 | 1/2018 | Szeto |
| 2018/0028079 A1 | 2/2018 | Gurevich |
| 2018/0032938 A1 | 2/2018 | Scriffignano |
| 2018/0077538 A1 | 3/2018 | Matus |
| 2018/0159873 A1 | 6/2018 | Bareket |
| 2018/0159879 A1 | 6/2018 | Mestha |
| 2018/0247020 A1 | 8/2018 | Itu |
| 2018/0276861 A1 | 9/2018 | Wright |
| 2018/0336481 A1 | 11/2018 | Guttmann |
| 2019/0121431 A1 | 4/2019 | Lee |
| 2019/0129732 A1 | 5/2019 | Sivertson |
| 2019/0156216 A1 | 5/2019 | Gupta |
| 2019/0172564 A1 | 6/2019 | Chandra |
| 2019/0228362 A1 | 7/2019 | Anagnostou |
| 2019/0294990 A1 | 9/2019 | Lopez De Prado |
| 2020/0050884 A1 | 2/2020 | Han |

OTHER PUBLICATIONS

[Item U continued] https://ieeexplore.ieee.org/stamp/stamp.jsp?tp=&arnumber=6690005&tag=1 (Year: 2013).*

Goldstein et al. "Peeking inside the black box: Visualizing statistical learning with plots of individual conditional expectation." Journal of Computational and Graphical Statistics 24.1 (2015): 44-65. https://arxiv.org/pdf/1309.6392.pdf (Year: 2015).

Hall et al. "Machine Learning Interpretability with H2O Driverless AI." Feb. 18, 2018 [retrieved Jul. 22, 2019] URL: https://web.archive.org/web/20180218055624/http://docs.h2o.ai/driverless-ai/latest-stable/docs/booklets/MLIBooklet.pdf pp. 1-40.

Katuwal et al., "Machine learning model interpretability for precision medicine." arXiv preprint arXiv: 1610.09045 (2016). https://arxiv.org/ftp/arxiv/papers/1610/1610.09045.pdf (Year: 2016).

Krishnan et al., "Palm: Machine learning explanations for iterative debugging." Proceedings of the 2nd workshop on human-in-the-loop data analytics. 2017. https://dl.acm.org/doi/pdf/10.1145/3077257.3077271.

Lei et al. "Distribution-free predictive inference for regression." Journal of the American Statistical Association 113.523 (2018): 1094-1111. https://arxiv.org/pdf/1604.04173.pdf (Year: 2017).

Ribeiro et al., "Why Should I Trust You?", Explaining the Predictions of Any Classifier, Proceedings of the 22nd ACM SIGKDD International conference on knowledge discovery and data mining. Aug. 9, 2016.

Ribeiro et al., "Model-agnostic interpretability of machine learning." arXiv preprint arXiv: 1606.05386 (2016). https://arxiv.org/pdf/1606.05386.pdf, 2016.

* cited by examiner

200

| | $F_1$ | $F_2$ | ... | $F_n$ | Prediction | Actual |
|---|---|---|---|---|---|---|
| $A_1$ | $X_1$ | $Y_1$ | ... | $Z_1$ | $P_1$ | 0 |
| $A_2$ | $X_2$ | $Y_2$ | ... | $Z_2$ | $P_2$ | 1 |
| ... | ... | ... | ... | ... | ... | ... |
| $A_n$ | $X_n$ | $Y_n$ | ... | $Z_n$ | $P_n$ | 0 |

| | $F_1$ | $F_2$ | ... | $F_n$ | Prediction | Actual |
|---|---|---|---|---|---|---|
| $A_1$ | $X_1$ | $Y_1$ | ... | $Z_1$ | $P_1$ | 0 |
| $A_{20}$ | $X_{20}$ | $Y_{20}$ | ... | $Z_{20}$ | $P_{20}$ | 0 |
| ... | ... | ... | ... | ... | ... | ... |
| $A_2$ | $X_2$ | $Y_2$ | ... | $Z_2$ | $P_2$ | 1 |

FIG. 2B

MODEL INTERPRETATION

CROSS REFERENCE TO OTHER APPLICATIONS

This application is a continuation of U.S. patent application Ser. No. 15/959,040 entitled MODEL INTERPRETATION filed Apr. 20, 2018 which is incorporated herein by reference for all purposes.

BACKGROUND OF THE INVENTION

Machine learning is a field of computer science that gives computers the ability to learn without being explicitly programmed. A machine learning model can be trained to implement a complex function that makes one or more predictions based on a set of inputs. The set of inputs is comprised of a plurality of entries. Each entry is associated with one or more features having corresponding feature values. Once trained, the machine learning model acts like a black box: it receives a set of inputs, the set of inputs are applied to the complex function, and one or more predictions are outputted.

BRIEF DESCRIPTION OF THE DRAWINGS

Various embodiments of the invention are disclosed in the following detailed description and the accompanying drawings.

FIG. 2A is an example of a diagram illustrating an embodiment of input data.

FIG. 2B is an example of a diagram illustrating an embodiment of input data that is ranked based on the prediction label.

DETAILED DESCRIPTION

Figure 1:
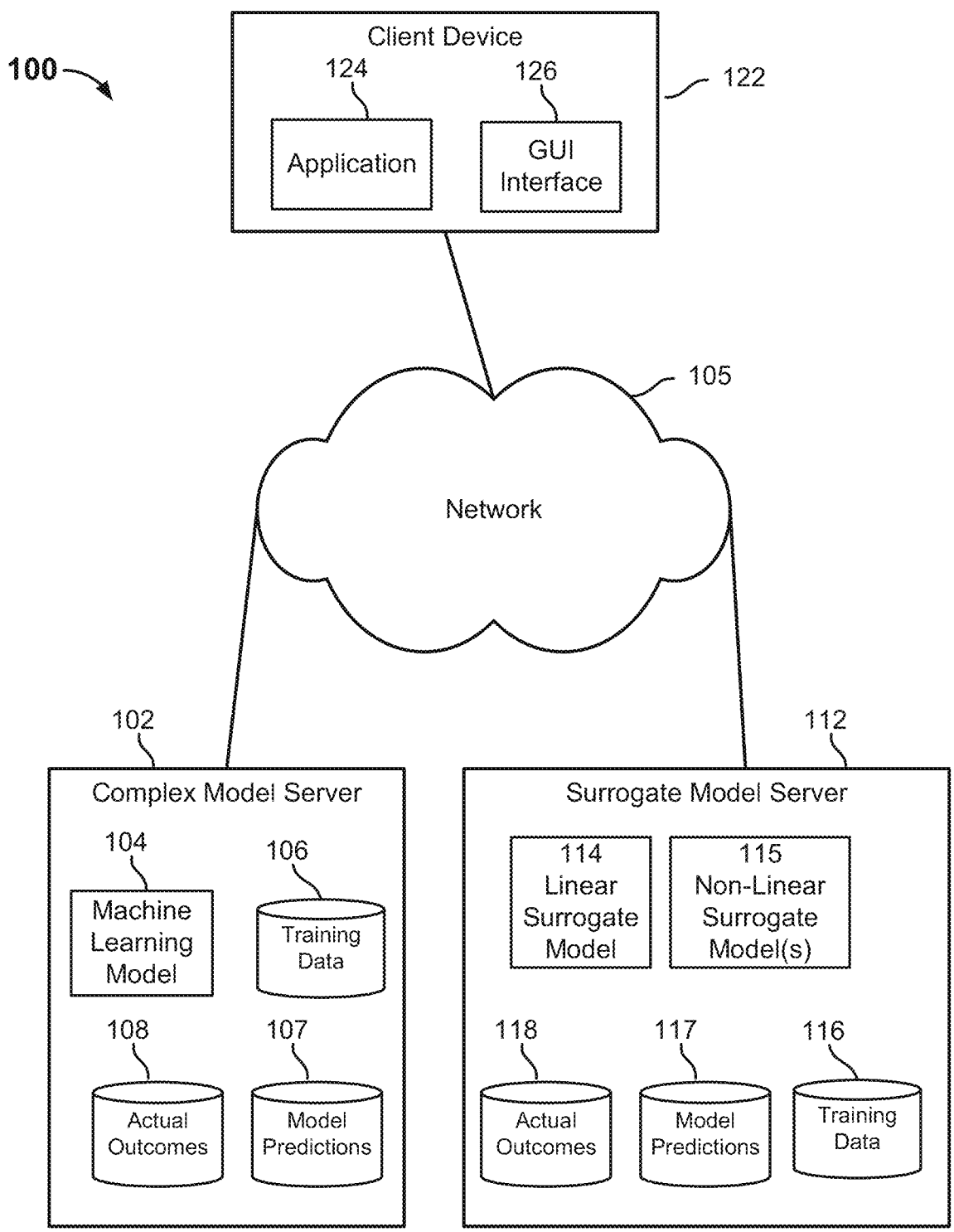
FIG. 1 is a block diagram illustrating an embodiment of a system for machine learning model interpretation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A machine learning model interpretation technique is disclosed. A machine learning model is configured to provide one or more predictions based on a set of inputs, however, it is unclear how the machine learning model arrived at its decision. Oftentimes the machine learning model is proprietary software of a company and users must receive a license to use the software. As a result, users are forced to purchase a license from the company.

The machine learning model may be limited in the type of information that is outputted to users. The machine learning model may output a prediction, but may not provide one or more reasons why the machine learning model made the prediction. For example, the machine learning model may not output an identification of one or more input features that influenced the prediction of the machine learning model.

A machine learning model may be approximated a linear surrogate models and/or one or more non-linear surrogate models. A surrogate model is a data mining and engineering technique in which a generally simpler model is used to explain another usually more complex model or phenomenon. A surrogate model may reduce the number of computations and the time needed by a computer to output a prediction. The reduction in computations and time frees up computer resources, which allows the computer to perform other tasks and/or make other predictions. A linear surrogate model may be a K-LIME surrogate model. A non-linear surrogate model may be a decision tree surrogate model, a feature importance surrogate model, and/or a partial dependence surrogate model. A surrogate model may not only provide a prediction that is similar to the prediction made by the machine learning model, but also provide one or more reasons that describe why the surrogate model made its decision.

Due to the complexity of the machine learning model, no one model by itself can be trusted to accurately approximate the machine learning model. However, the combination of the linear surrogate model and the one or more non-linear surrogate models may provide confidence in the approximations. In some instances, the output of a linear surrogate model may closely match the output of the machine learning model, but the output of the linear surrogate model may be in conflict with the output of at least one of the non-linear surrogate models. In other instances, the output of a linear surrogate model may be in conflict with the output of the machine learning model, but the output of the one or more non-linear surrogate models closely matches the output of the machine learning model. In other instances, neither the output of the linear surrogate model nor the output of the one or more non-linear surrogate models closely match the output of the machine learning model. In these instances, neither the linear surrogate model nor the one or more non-linear surrogate models can be used to explain the machine learning model. As a result, either the linear surrogate model or at least one of the one or more non-linear surrogate models, or even the machine learning model itself may need to be modified.

However, in the instance where the output of a linear surrogate model closely matches the output of the machine learning model and the output of a non-linear surrogate models closely matches the output of the machine learning model, the combination of the linear surrogate model and the one or more non-linear surrogate models may be trusted to accurately explain the machine learning model of interest.

This is an improvement to the field of machine learning because a machine learning model that implements a complex function to make one or more predictions based on a set of inputs may be accurately approximated using a combination of a linear surrogate model and the one or more non-linear surrogate models. The combination of a linear surrogate model and the one or more non-linear surrogate models may reduce the number of computations and time needed by a computer to make a prediction when compared to the number of computations and time needed by a computer implementing the machine learning model to make the prediction. The combination of a linear surrogate model and the one or more non-linear surrogate models provide transparency into the machine learning model. The linear surrogate model and the one or more non-liner surrogate models allow the underlying machine learning model itself to be debugged.

FIG. 1 is a block diagram illustrating an embodiment of a system for machine learning model interpretation. In the example shown, system 100 includes a complex model server 102, a network 105, a surrogate model server 112, and a client device 122.

Complex model server 102 includes a machine learning model 104, training data 106, model prediction data 107, and actual outcome data 108. The machine learning model 104, training data 106, model prediction data 107, and actual outcome data 108 may be stored in memory and/or storage (not shown) of complex model server 102. Complex model server 102 may include one or more processors, one or more memories (e.g., random access memory), and one or more storage devices (e.g., read only memory).

Machine learning model 104 is configured to implement one or more machine learning algorithms (e.g., decision trees, naïve Bayes classification, least squares regression, logistic regression, support vector machines, neural networks, deep learning, etc.). Machine learning model 104 may be trained using training data, such as training data 116. Once trained, machine learning model 104 is configured to output a prediction label, such as model prediction data 107, based on an input entry that is comprised of one or more features and corresponding feature values.

Training Data 106 is comprised of a plurality of entries. Each entry is associated with one or more features having a corresponding feature value.

Model Prediction data 107 is comprised of predictions made by machine learning model 104. Model prediction data 107 may include a probability of a particular outcome that the machine learning model has predicted. Model prediction data 107 may include a prediction label (e.g., predicted value) for a particular prediction.

Actual Outcome data 108 is comprised of real world outcome data. For example, machine learning model 104 may be trained to predict the probability of a particular outcome given input data that is comprised of a plurality of entries. Actual outcome data 108 includes the real world outcome for an entry associated with a plurality of features and corresponding feature values.

Network 105 may be a local area network, a wide area network, a wired network, a wireless network, the Internet, an intranet, or any other appropriate communication network.

Surrogate model server 112 includes a linear surrogate model 114, one or more surrogate non-linear models 115, training data 116, model prediction data 117, and actual outcome data 118. The linear surrogate model 114, one or more surrogate non-linear models 115, training data 116, model prediction data 117, and actual outcome data 118 may be stored in memory and/or storage (not shown) of complex model server 112.

Surrogate model server 112 is configured to implement one or more surrogate models. A surrogate model is a data mining and engineering technique in which a generally simpler model is used to explain another usually more complex model or phenomenon. Surrogate model 112 may receive, from complex model server 102 via network 105, training data 106, model prediction data 107, and actual outcome data 108 and store as training data 116, model prediction data 117, and actual outcome data 118, respectively. Using training data 116, model prediction data 117, and actual outcome data 118, surrogate model server 122 may train one or more surrogate models to make one or more predictions. The one or more surrogate models are surrogates of machine learning model 104. Given a learned function g (e.g., machine learning model 104) and a set of predictions (e.g., model predictions 107), g(X)=Ŷ, a surrogate model h may be trained, such that $$X, \hat{Y} \xrightarrow{A_{surrogate}} h,$$

such that h(X)≈g(X). The surrogate model h may be a linear model or a non-linear model.

Linear Model

Linear surrogate model 114 may be a K-LIME surrogate model. With K-LIME, local generalized linear model (GLM) surrogates are used to explain the predictions of complex response functions, and local regions are defined by K clusters or user-defined segments instead of simulated, perturbed observation samples.

For each cluster, a local GLM $h_{GLM,k}$ is trained. The input data may be classified into a plurality of clusters using a clustering technique, such as k-means clustering. K may be chosen such that predictions from all the local GLM models would maximize $R^2$. This may be summarized mathematically as follows:

$$(X_k, g(X_k)) \xrightarrow{A_{GLM}} h_{GLM,k}, \forall\, k \in \{0, \ldots, K-1\}$$

$$\underset{K}{\mathrm{argmax}}\, R^2(Y, h_{GLM,k}(X_k)) \forall\, k \in \{0, \ldots, K-1\}$$

K-LIME may also train one global surrogate GLM $h_{global}$ on the entire input training dataset, such as training data 106 and global model predictions g(X), such as model prediction data 107. In some embodiments, in the event a given k-th cluster has less than a threshold number of members (e.g., 20), then $h_{global}$ is used as a linear surrogate instead of $h_{GLM,k}$. In some embodiments, intercepts, coefficients, $R^2$ values, accuracy, and predictions from all the surrogate K-LIME models (including the global surrogate) may be used to debug and increase transparency in g.

One or more reason codes and corresponding values may be generated from K-LIME. A reason code corresponds to an input feature. The reason code value may provide a feature's approximate local, linear contribution to $g(x^{(i)})$. Reason codes are powerful tools for accountability and fairness because they provide an explanation for each $g(x^{(i)})$, enabling a user to understand the approximate magnitude and direction of an input feature's local contribution for $g(x^{(i)})$. In K-LIME, reason code values may be calculated by determining each coefficient-feature product. Reason codes may also be written into automatically generated reason codes.

For $h_{GLM,k}$ and observation $x^{(i)}$:

$$g(x^{(i)}) \approx h_{GLM,k}(x^{(i)}) = \beta_0^{[k]} + \sum_{p=1}^{P} \beta_p^{[k]} x_p^{(i)}$$

By disaggregating the K-LIME predictions into individual coefficient-feature products, $\beta_p^{[k]} x_p^{(i)}$, the local, linear contribution of the feature can be determined. This coefficient-feature product is referred to as a reason code value and is used to create reason codes for each $g(x^{(i)})$.

K-LIME provides several scales of interpretability: (1) coefficients of the global GLM surrogate provide information about global, average trends, (2) coefficients of in-segment GLM surrogates display average trends in local regions, and (3) when evaluated for specific in-segment observations, K-LIME provides reason codes on a per-observation basis. K-LIME may increase transparency by revealing input features and their linear trends. K-LIME may enhance accountability by creating explanations for each observation in a data set. K-LIME may bolster trust and fairness when the important features and their linear trends around specific records conform to domain knowledge and reasonable expectations.

Non-Linear Models

The one or more surrogate non-linear models 115 may include a feature importance model, decision tree model, a partial dependence plot, and/or any other non-linear models.

A feature importance model measures the effect that a feature of the set of inputs has on the predictions of the model. A feature may have a global feature importance and a local feature importance. Global feature importance measures the overall impact of an input feature on the model predictions while taking nonlinearity and interactions into considerations. Global feature importance values give an indication of the magnitude of a feature's contribution to model predictions for all observations. Local feature importance describes how the combination of the learned model rules or parameters and an individual observation's attributes affect a model's prediction for that observation while taking nonlinearity and interactions into effect.

The feature importance model may include a random forest surrogate model $h_{RF}$ consisting of B decision trees $h_{tree,b}$. The random forest surrogate model is a global interpretability measure. For example, $h_{RF}$ may be expressed as:

$$h_{RF}(x^{(i)}) = \frac{1}{B} \sum_{b=1}^{B} h_{tree,b}(x^{(i)}; \Theta_b)$$

where $\Theta_b$ is the set of splitting rules for each tree $h_{tree,b}$. At each split in each tree $h_{tree,b}$, the improvement in the split-criterion is the importance measure attributed to the splitting feature. The importance feature is accumulated over all trees separately for each feature. The aggregated feature importance values may be scaled between 0 and 1, such that the most important feature has an importance value of 1.

The feature importance model may include leave-one-covariate-out (LOCO). LOCO feature importance is a local interpretability measure. LOCO provides a mechanism for calculating importance values for any model g on a per-observation basis $x^{(i)}$ by subtracting the model's prediction for an observation of data, $g(x^{(i)})$, from the model's prediction for that observation of data without an input feature $X_j$ of interest, $g(x_{(-j)}^{(i)}) - g(x^{(i)})$. LOCO is a model-agnostic idea, and $g(x_{(-j)}^{(i)})$ may be calculated in various ways. In some embodiments, $g(x_{(-j)}^{(i)})$ is calculated using a model-specific technique in which the contribution $X_j$ to $g(x^{(i)})$ is approximated by using the random forest surrogate model $h_{RF}$. The prediction contribution of any rule $\theta_r^{[b]} \in \Theta_b$ containing $X_j$ for tree $h_{tree,b}$ is subtracted from the original prediction $h_{tree,b}(x^{(i)}; \Theta_{b,(-j)})$. For the random forest:

$$g(x_{(-j)}^{(i)}) = h_{RF}(x_{(-j)}^{(i)}) = \frac{1}{B} \sum_{b=1}^{B} h_{tree,b}(x^{(i)}; \Theta_{b,(-j)})$$

where $\Theta_{b,(-j)}$ is the set of splitting rules for each tree $h_{tree,b}$ with the contributions of all rules involving $X_j$ removed. In some embodiments, the LOCO feature importance values are scaled between 0 and 1 such that the most important feature for an observation of data, $x^{(i)}$, has an importance value of 1 for direct versus local comparison to random forest feature importance.

Random forest feature importance increases transparency by reporting and ranking influential input features. LOCO feature importance enhances accountability by creating explanations for each model prediction. Both global and local feature importance enhance trust and fairness when reported values conform to domain knowledge and reasonable expectations.

A decision tree model $h_{tree}$ may be generated to approximate the learned function g (e.g., machine learning model 104). $h_{tree}$ is used to increase the transparency of g by displaying an approximate flow chart of the decision making process of g. $h_{tree}$ also shows the likely important features and the most important interactions of g. $h_{tree}$ may be used for visualizing, validating, debugging g by comparing the displayed decision-process, important features, and important interactions to known standards, domain knowledge, and reasonable expectations.

A partial dependence plot may show how machine-learned response functions change based on the values of an input feature of interest, while taking nonlinearity into consideration and averaging out the effects of all other input features.

For a P-dimensional feature space, consider a single feature $X_j \in \mathcal{P}$ and its complement set $X_{(-j)}$ (i.e., $X_j \cup X_{(-j)} = \mathcal{P}$). The one-dimensional partial dependence of a function g on $X_j$ is the marginal expectation:

$$PD(X_j, g) = \mathbb{E}_{X_{(-j)}}[g(X_j, X_{(-j)})]$$

Recall that the marginal expectation over $X_{(-j)}$ sums over the values of $X_{(-j)}$. The one-dimensional partial dependence may be expressed as:

$$PD(X_j, g) = \mathbb{E}_{X(-j)}[g(X_j, X_{(-j)})]$$
$$= \frac{1}{N}\sum_{i=1}^{P} g(X_j, x_{(-j)}^{(i)})$$

The partial dependence of a given feature $X_j$ is the average of the response function g, setting the given feature $X_j = x_j$ and using all other existing feature vectors of the complement. set $x_{(-j)}^{(i)}$ as they exist in the dataset. A partial dependence plot shows the partial dependence as a function of specific values of the feature subset $X_j$. Partial dependence plots enable increased transparency in g and enable the ability to validate and debug g by comparing a feature's average predictions across its domain to known standards and reasonable expectations.

In some embodiments, the partial dependence plot includes an individual conditional expectation (ICE) plot. ICE is a disaggregated partial dependence of the N responses $g(X_j, x_{(-j)}^{(i)})$, $i \in \{1, \ldots, N\}$ (for a single feature $X_j$), instead of averaging the response across all observations of the training set. An ICE plot for a single observation $x^{(i)}$ is created by plotting $g(X_j = x_{j,q} x_{(-j)}^{(i)})$ versus $X_j = x_{j,q} (q \in \{1, 2, \ldots\})$ while fixing $x_{(-j)}^{(i)}$. The ICE plot may allow a prediction for an individual observation of data $g(x^{(i)})$ to determine whether the individual observation of data is outside one standard deviation from the average model behavior represented by partial dependence. The ICE plot may also allow a prediction for an individual observation of data $g(x^{(i)})$ to determine whether the treatment of a specific observation is valid in comparison to average model behavior, known standards, domain knowledge, and/or reasonable expectations.

Training data 116 includes data that is used to train linear surrogate model 114 and/or one or more non-linear surrogate models 115. Training data 116 may include at least a portion of training data 106. Training Data 116 is comprised of a plurality of entries. Each entry is associated with one or more features having a corresponding value and associated actual outcomes.

Model Prediction data 117 is comprised of predictions made by machine learning model 104, predictions made by linear surrogate model 114, and predictions made by one or more non-linear surrogate models 115. Model prediction data 117 may include a prediction label (e.g., probability of a particular outcome, predicted value, prediction value±offset value, etc.) that machine learning model 104 has predicted, a prediction label that linear surrogate model 114 has predicted, and a predication label that one or more non-linear surrogate models 115 has predicted.

Actual Outcome data 118 is comprised of real world outcome data. For example, machine learning model 104, linear surrogate model 114, and one or more non-linear surrogate models 115 may be trained to predict the probability of a particular outcome given a set of inputs. Actual outcome data 118 includes the real world outcome given the set of inputs (e.g., did the particular outcome occur or not occur).

Client device 122 may be a computer, a laptop, a mobile device, a tablet, etc. Client device 122 includes an application 124 associated with surrogate model server 112. Application 124 is configured to display via graphical user interface 126, one or more graphs depicting the linear surrogate model 114 and at least one of the one or more non-linear surrogate models 115.

In some embodiments, graphical user interface 126 is configured to receive a selection of a point (e.g., observation) shown in the linear surrogate model. In response to the selection, application 124 is configured to dynamically update the one or more non-linear surrogate models associated with the linear surrogate model and dynamically update a display of the one or more non-linear surrogate models. Application 124 is also configured to provide an indication of the received selection to surrogate model server 112. In response to the indication, a linear surrogate model may be configured to provide one or more reason codes and corresponding reason code values to application 124. In response to the indication, a non-linear surrogate model may be configured to provide one or more important features for the selected point. In response to the indication, a non-linear surrogate model may be configured to highlight a decision tree path associated with the selected point.

FIG. 2A is an example of a diagram illustrating an embodiment of input data. Input data is comprised of training data, validation data, model prediction data, and actual outcome data. In the example shown, input data 200 may be implemented by a system, such as complex model server 102 or surrogate model server 112.

In the example shown, input data 200 includes entries $A_1$, $A_2 \ldots A_n$. Each entry is comprised of one or more features having a corresponding feature value. For example, entry $A_1$ is comprised of features $F_1, F_2 \ldots F_n$ that have corresponding feature values of $X_1, Y_1 \ldots Z_1$. Entry $A_2$ is comprised of features $F_1, F_2 \ldots F_n$ that have corresponding feature values of $X_2, Y_2 \ldots Z_2$. Entry $A_n$ is comprised of features $F_1, F_2 \ldots F_n$ that have corresponding feature values of $X_n$, $Y_n \ldots Z_n$. In some embodiments, a feature value may correspond to the actual value of a feature (e.g., temperature=98°). In other embodiments, a feature value may correspond to one of the ranges of values (e.g., a value of "2" indicates a temperature range of 20-40). In other embodiments, a feature value may correspond to one of the possible non-numerical values (e.g, "0"=male, "1"=female). In other embodiments, a feature value may be a string.

A model, such as machine learning model 104, linear surrogate model 114, or surrogate non-linear model(s) 115 may perform a prediction based on an entry, the features and corresponding feature values associated with the entry. For example, a model may output a prediction label $P_1$ for $A_1$ based on the features $F_1, F_2 \ldots F_n$ and their corresponding feature values $X_1, Y_1 \ldots Z_1$. A model may output a prediction of $P_1, P_2 \ldots P_n$ for each of the entries $A_1$, $A_2 \ldots A_n$, respectively. The prediction label may be a probability of a particular outcome, a predicted value, a predicted value plus an offset range, a predicted value plus a confidence level, etc.

Input data 200 may include actual outcome data, e.g., whether or not a particular outcome occurred, the actual value for an output variable, etc. A value of 1 may indicate that the particular outcome occurred. A value of 0 may indicate that the particular outcome did not occur. In other embodiments, a value of 1 indicates that the particular output did not occur and a value of 0 indicates that the particular outcome did occur.

In some embodiments, a model, such as machine learning model 104, linear surrogate model 114, or surrogate non-linear model(s) 115 may predict that a particular outcome is to occur (e.g., greater than or equal to a prediction threshold) and the particular outcome actually occurred (e.g., a value of 1). In some embodiments, a model, such as machine learning model 104, linear surrogate model 114, or surrogate non-linear model(s) 115 may predict that a particular outcome is to occur (e.g., greater than or equal to a prediction threshold) and the particular outcome did not actually occurred (e.g., a value of 0). In some embodiments, a model, such as machine learning model 104, linear surrogate model 114, or surrogate non-linear model(s) 115 may predict that a particular outcome is not to occur (e.g., less than a prediction threshold) and the particular outcome actually occurred (e.g., a value of 1). In some embodiments, a model, such as machine learning model 104, linear surrogate model 114, or surrogate non-linear model(s) 115 may predict that a particular outcome is not to occur (e.g., less than a prediction threshold) and the particular outcome did not actually occur (e.g., a value of 0).

FIG. 2B is an example of a diagram illustrating an embodiment of input data that is ranked based on the prediction label. In the example shown, sorted training data 250 may be implemented by a system, such as complex model server 102 or surrogate model server 112.

In the example shown, input data 250 includes entries $A_1$, $A_{20}$ . . . $A_2$. The entries for input data 250 are the same entries for input data 200, but ranked based on the prediction label. The prediction label may be a probability of a particular outcome. In some embodiments, the entries are ranked from a lowest prediction label to the highest prediction label. In some embodiments, the entries are ranked from a highest prediction label to the lowest prediction label.

Figure 3:
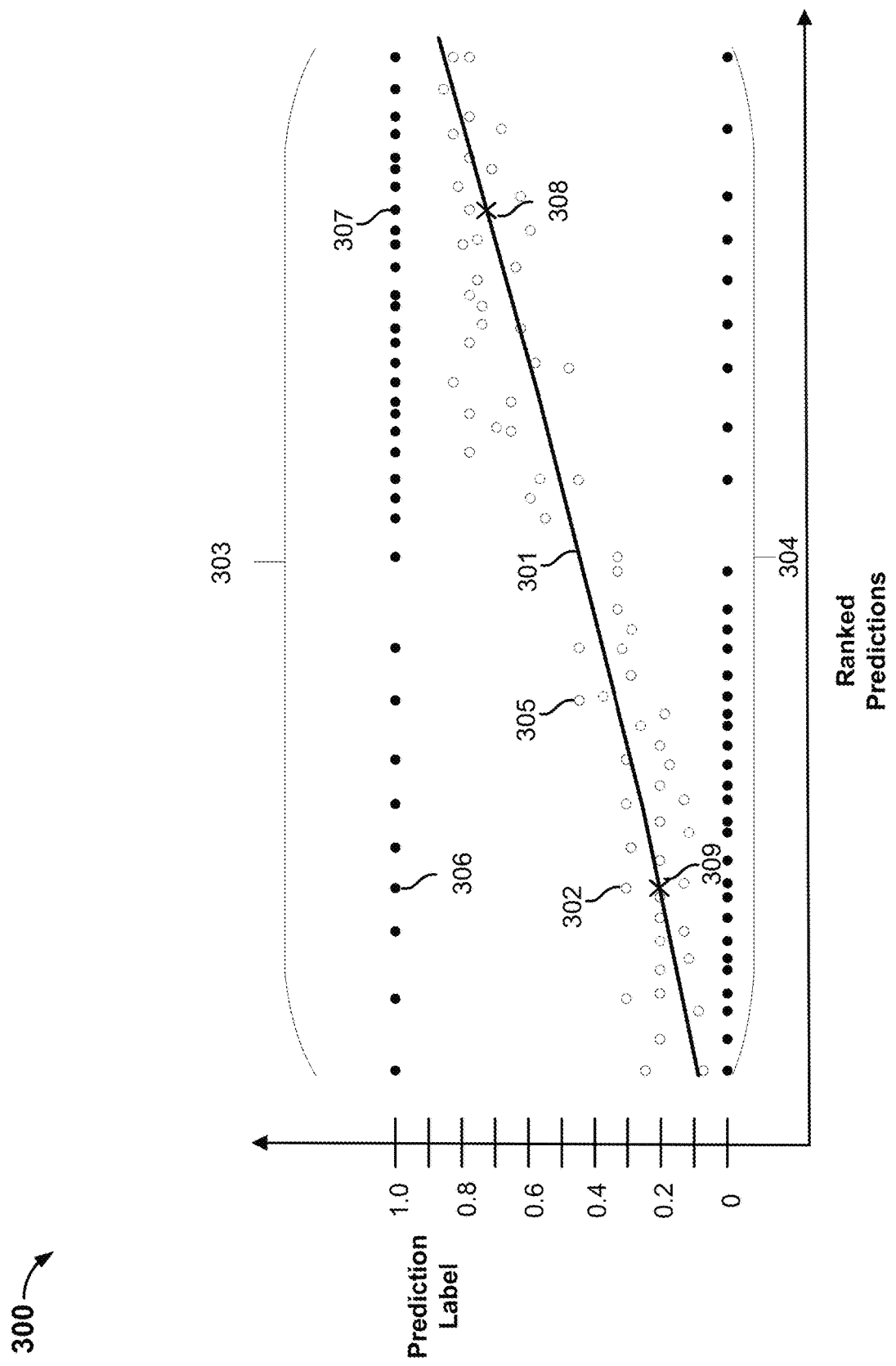
FIG. 3 is a diagram illustrating an embodiment of an output of a linear surrogate model.

FIG. 3 is a diagram illustrating an embodiment of an output of a linear surrogate model. Linear model graph 300 may be implemented by a system, such as surrogate model server 112. Linear model graph 300 may represent the output of a linear model, such as linear surrogate model 114. Linear surrogate model 114 is a surrogate model of a more complex function, such as machine learning model 104.

Linear model graph 300 plots the prediction label associated with entries versus ranked predictions. The y-axis of linear model graph 300 indicates a score made by a model, such as machine learning model 104 or linear surrogate model 114. The x-axis of linear model graph 300 indicates a prediction ranking associated with a set of inputs. The set of entries are ranked based on the prediction label and plotted sequentially. For example, FIG. 2B depicts a set of entries that are ranked based on the corresponding prediction label. The entries included in input data 250 would plotted in the following order: $A_1, A_{20}$ . . . and $A_2$.

Linear model graph 300 includes a line 301 that represents the prediction labels associated with a set of inputs that are determined by a machine learning model, such as machine learning model 104. For example, line 301 may be a plot of predictions $P_1, P_{20}$ . . . $P_2$ of input data 250. The prediction values associated with line 301 may be determined by a machine learning algorithm (e.g., decision trees, naïve bayes classification, least squares regression, logistic regression, support vector machines, neural networks, deep learning, etc.).

Linear model graph 300 includes a series of observations, for example, white dots 302, 305, that represent the prediction labels associated with a set of entries that are determined by a linear model, such as linear surrogate model 114. In some embodiments, an observation is associated with a global surrogate model. The observation may represent a prediction label of a global surrogate model for a particular entry. In other embodiments, an observation is associated with a local linear model.

The prediction label associated with each observation may be determined by a K-LIME model. Linear surrogate model 114 may be comprised of a plurality of local linear models. The set of entries may be classified into one or more clusters using one or more techniques (e.g., k-means clustering). Each cluster represents a subset of the entries that are similar to each other. An entry may be associated with a cluster based on a distance between the entry and a cluster centroid. In the event the entry is less than or equal to a threshold distance away from a cluster centroid, an entry is associated with the cluster. In the event the entry is greater than a threshold distance away from a cluster centroid, an entry is associated with a different cluster. A local linear model may be generated for each cluster. The cluster local linear model may be trained using entries that are associated with a particular cluster. For example, for a set of entries that is classified into 11 clusters, each of the 11 clusters may have a corresponding local linear model. Each local linear model is configured to make a prediction for the subset of entries that are included in a cluster. A local linear model is configured to make a prediction based on the one or more features and corresponding feature values of an entry. For example, suppose white dot 302 is part of a first cluster and white dot 305 is part of a second cluster. A first local linear model may be configured to generate a prediction for white dot 302 based on the one or more features and corresponding feature values of white dot 302 and a second local linear model may be configured to generate a prediction for white dot 305 based on the one or more features and corresponding feature values of white dot 305.

In some embodiments, an entry is added to a cluster (e.g., production data) by determining a cluster centroid that is closest to the entry. The entry and cluster centroids have a particular location in feature space. For example, an entry is comprised of a plurality of features and corresponding feature values. The entry location in feature space may be represented as a vector, e.g., $\{X_1, Y_1 \ldots Z_1\}$. The closest cluster may be determined by computing a distance between the entry in the feature space and the cluster centroid in the feature space. The closest cluster corresponds to a local linear model that has one or more associated model parameters. After the closest centroid cluster is determined, a prediction label for the input may be determined by inputting the feature values associated with the feature to a local linear model that corresponds to the closest centroid cluster.

Linear model graph 300 includes a set of actual outcome data, for example, black dots 303, 304. Black dots 303 indicate that the particular outcome actually occurred for entries having a set of features and corresponding feature values. Black dots 304 indicate that the particular outcome did not occur for entries having a set of features and corresponding feature values.

In some embodiments, the machine learning model prediction correlates with the actual outcome data. For example, a point 308 on line 301 indicates a particular outcome is likely to happen (prediction label≈0.75) and black dot 307 indicates that the particular outcome actually occurred.

In some embodiments, the machine learning model prediction does not correlate with the actual outcome data. For example, a point 309 on line 301 indicates that a particular outcome is unlikely to happen (prediction label≈0.2) and black dot 306 indicates that the particular outcome actually occurred.

Each of the observation points, i.e., the white dots, has a corresponding black dot. For example, white dot 302 has a corresponding black dot 306. In some embodiments, a global surrogate model correlates with the actual outcome data. In some embodiments, a global surrogate model does not correlate with the actual outcome data. In some embodiments, a local linear model prediction correlates with the actual outcome data. In some embodiments, a local linear model prediction does not correlate with the actual outcome data.

Each of the observation points may be selected. In response to being selected, one or more reason codes and corresponding reason code values may be displayed. A reason code corresponds to a feature. A reason code value corresponds to the amount that the feature contributed to the local model's prediction label (e.g., weight) for that observation point (input point). A linear surrogate model may determine the reason codes and corresponding reason code values for a particular observation point. The sum of the reason code values may be equal to the prediction label. Instead of displaying all the reason codes and corresponding reason code values for a particular observation point, in some embodiments, the top reason codes (e.g., top 5 reason codes) are be displayed, i.e., the most influential features. For example, white dot 302 has a prediction label of approximately 0.3. The top reason codes "F1," "F18," "F3," "F50," "F34," and corresponding reason code values may be displayed. In other embodiments, selecting an observation point may cause all the reason codes and corresponding reason code values for the selected observation point to be displayed.

Figure 4A:
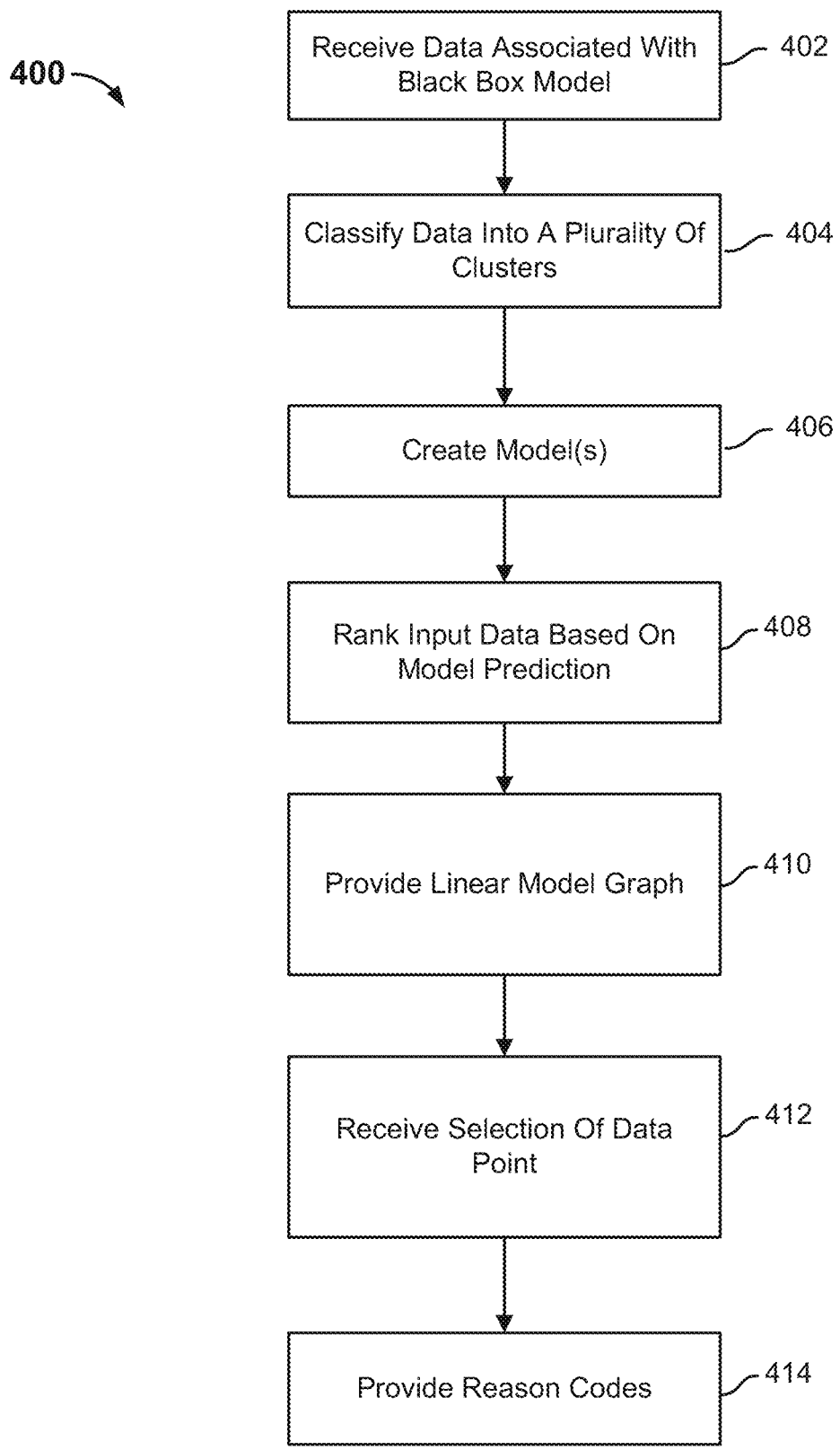
FIG. 4A is a flow chart illustrating an embodiment of a process for providing a linear surrogate model.

FIG. 4A is a flow chart illustrating an embodiment of a process for providing a linear surrogate model. In the example shown, process 400 may be implemented by a system, such as surrogate model server 112.

At 402, data associated with a machine learning model is received. The data may include training data that was used to train the machine learning model. The data may include prediction data of the machine learning model associated with an entry of the training data. The data may include actual outcome data associated an entry with one or more features having a corresponding feature value, i.e., whether or not the particular outcome actually occurred.

At 404, the data associated with a machine learning model is classified into a plurality of clusters. The data may be classified into the plurality of clusters using one or more techniques (e.g., k-means clustering). Each cluster represents a subset of the entries that are similar to each other. A cluster is comprised of a plurality of entries. Each entry is comprised of one or more features having a corresponding feature value. Each entry has a corresponding location, e.g., $(F_1, F_2 \ldots F_n)$ in a feature space. In some embodiments, a cluster is determined based on one or more entries that are within a threshold distance from a point (e.g., cluster centroid) in the feature space.

At 406, a model is created. In some embodiments, a global surrogate model is created based on the input data. In other embodiments, a separate linear model is created for each cluster. Each linear model is configured to output a prediction label. For example, a linear model may determine a prediction $P_1$ that indicates a probability of whether a particular outcome will occur given an entry $A_1$ that is comprised of features $F_1, F_2 \ldots F_n$ having corresponding feature values of $X_1, Y_1 \ldots Z_1$.

At 408, the entries are ranked based on a model prediction. In some embodiments, the entries are ranked based on a prediction made by a machine learning model, such as machine learning model 104. In other embodiments, the entries are ranked based on the prediction made by a linear surrogate model, such as linear surrogate model 114. In some embodiments, the entries are ranked from a lowest prediction label to the highest prediction label. In some embodiments, the entries are ranked from a highest prediction label to the lowest prediction label.

At 410, a linear model graph, such as linear model graph 300, is provided. In some embodiments, the linear model graph is provided from a surrogate model server to a client device via a network. The client device may display the linear model graph via an application running on the client device.

At 412, a selection of an observation point included in the linear model graph is received. For example, a client device may receive via a GUI, a selection for a dot, such as white dot 302. One or more non-linear model graphs may be updated based on the selected point.

At 414, one or more reason codes are provided. The one or more reason codes include a set of features that predominately caused the entry to have the corresponding prediction label. For example, a series of reason codes may be provided to indicate why white dot 302 has a prediction label of 0.3. Each reason code has a corresponding reason code value that indicates a contribution to the prediction label. The cumulative contributions of the reason codes is equal to the prediction label.

Figure 4B:
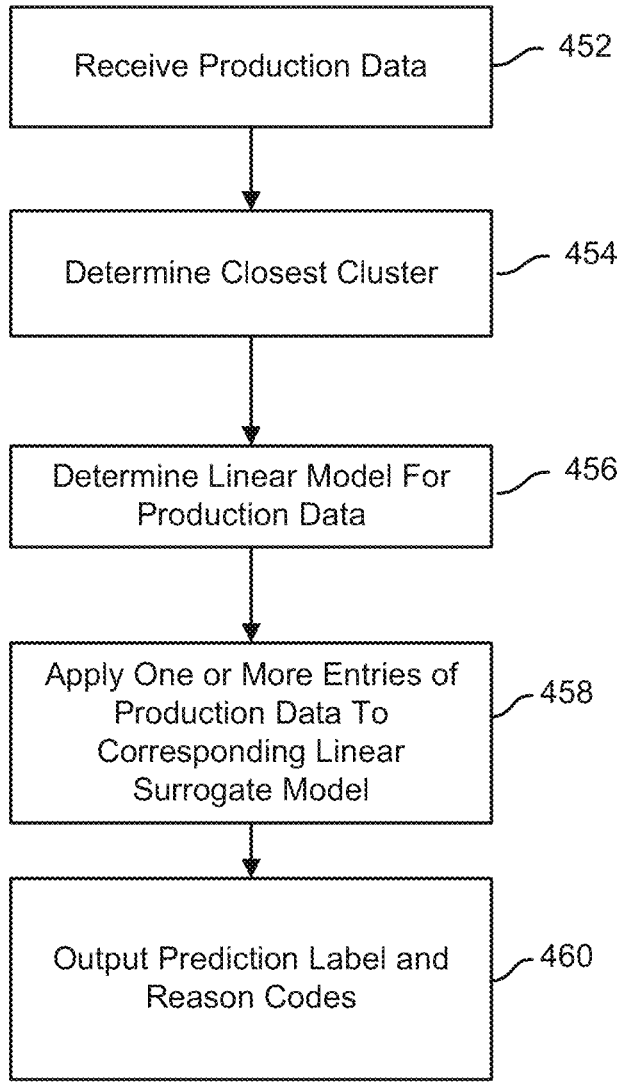
FIG. 4B is a flow chart illustrating an embodiment of a process for providing a prediction.

FIG. 4B is a flow chart illustrating an embodiment of a process for providing a prediction. Process 450 may be implemented by a system, such as surrogate model server 112.

At 452, production data is received. Production data is comprised of one or more entries. Each entry is associated with one or more features having corresponding feature values. The one or more entries of the production data do not include a corresponding prediction label.

At 454, a closest cluster is determined for each entry of the production data. An entry of the production data is comprised of a plurality of feature values. The feature values correspond to a location in feature space. A cluster centroid of a cluster has a corresponding location in the feature space. A closest centroid is determined for each entry of the production data. The closest centroid may be determined by computing a distance between the location of an entry in feature space and a location of a cluster centroid in the feature space.

At 456, a linear surrogate model for each entry of the production data is determined. Each cluster has a corresponding linear surrogate model.

At 458, the one or more entries of production data are applied to a corresponding linear surrogate model. For example, a first entry of the production data may be applied to a first linear surrogate model that corresponds to a first cluster and a second entry of the production data may be applied to a second linear surrogate model that corresponds to a second cluster.

At 460, a prediction label and one or more reason codes are outputted. Each linear surrogate model outputs a corresponding prediction label. The prediction label may be a probability of a particular outcome, a predicted value, a prediction value±offset value, etc. The reason codes provide an explanation as to why the prediction label has a certain output.

Figure 5:
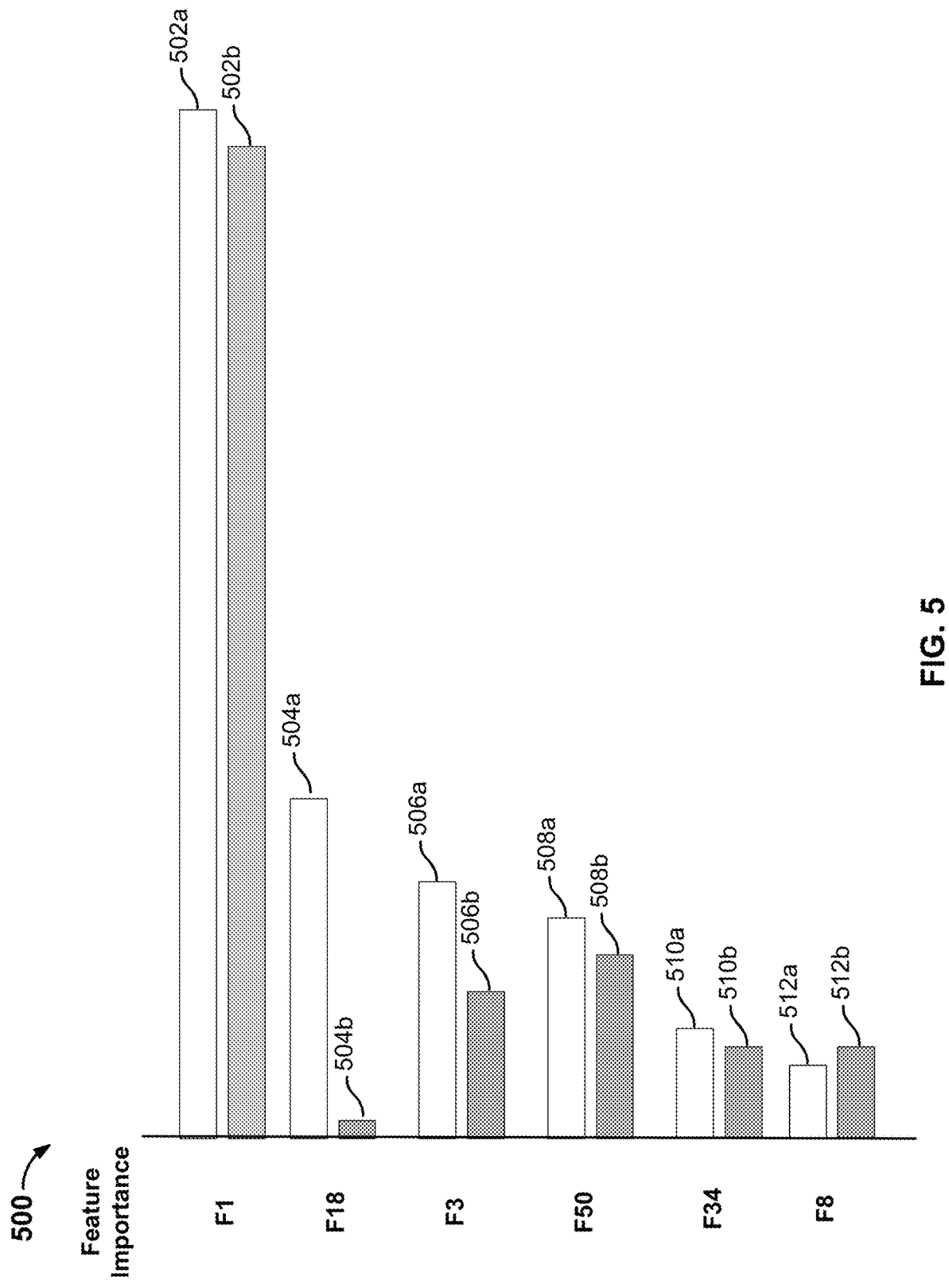
FIG. 5 is a diagram illustrating an embodiment of a non-linear surrogate model.

FIG. 5 is a diagram illustrating an embodiment of a non-linear surrogate model. Non-linear model graph 500 may be implemented by a system, such as surrogate model server 112. Non-linear model graph 500 may represent the output of a non-linear surrogate model, such as one of the non-linear surrogate models 115. A non-linear surrogate model 115 is a surrogate model of a more complex function, such as machine learning model 104.

Non-linear model graph 500 illustrates the feature importance of one or more features. Feature importance measures the effect that a feature has on the predictions of a model. Non-linear model graph 500 includes a global feature importance and a local feature importance for a particular feature. In some embodiments, the features are sorted in descending order from the globally most important feature to the globally least important feature.

The global feature importance measures the overall impact of the feature on the model predictions while taking nonlinearity and interactions into consideration. A global feature importance value provides an indication of the magnitude of a feature's contribution to model predictions for all observations. For example, the global importance value may indicate the importance of a feature for a global surrogate model, i.e., the importance of the feature for all entries. In some embodiments, the global feature importance value is equal to the number of times in a decision tree ensemble (e.g., global decision tree surrogate model) that a feature was selected to split a decision tree of the decision tree ensemble. In some embodiments, the global feature importance value is scaled to a number between 0 and 1, such that the most important feature has an importance value of 1. In some embodiments, the global feature importance value is weighted based on a location of a feature in a decision tree. For example, a feature that is selected at the top of a decision tree for a split has a weight that is higher than another feature that is selected at the bottom of a decision tree for a split. In some embodiments, the weight is a value between 0 and 1. A weight of approximately 1 indicates that the feature was selected at or near the top of a decision tree. A weight of approximately 0 indicates that the feature was not selected for a branch of the decision tree or was selected at or near the bottom of a decision tree. In some embodiments, the weight is a value greater than 1.

Local feature importance describes how the combination of the learned model rules or parameters and an individual observation's attributes affect a model's prediction for that observation while taking nonlinearity and interactions into effect. For example, the local feature importance may indicate the importance of a feature associated with an entry (e.g., observation point) for a global surrogate model, i.e., the importance of the feature for this particular entry. The local feature importance value may be determined by computing a LOCO value for a feature. An entry is comprised of a plurality of features. A first prediction is computed using the plurality of features and a second prediction is computed using the plurality of features less one of the plurality of features. The second prediction is subtracted from the first prediction to determine the importance of the feature. The LOCO value is computed for each feature of the plurality of features.

As seen in FIG. 5, features "F1," "F18," "F3," "F50," "F34," and "F8" are depicted as the most important features for a prediction. In some embodiments, the most important features are the most important features for a global surrogate model. In other embodiments, the most important features are the most important features for a selected observation point. The global importance values and local importance values are shown for each feature. For example, the global importance values of 502a, 504a, 506a, 508a, 510a, and 512a are shown for features "F1," "F18," "F3," "F50," "F34," and "F8," respectively. The local importance values of 502b, 504b, 506b, 508b, 510b, and 512b are shown for features "F1," "F18," "F3," "F50," "F34," and "F8," respectively.

In some embodiments, the global importance value for a feature correlates with the local importance value for the feature. For example, the global importance value for a feature correlates with the local importance value for the feature in the event the difference between the two values is less than or equal to a threshold value. The global importance value for a feature does not correlate with the local importance value for the feature in the event the difference between the two values is greater than a threshold value. In the event the global importance value for a feature and the local importance value for the feature do not correlate, the entry with which the prediction is associated may be flagged. In some embodiments, the feature importance model is investigated to determine why the model outputted such values. In the event a threshold number of entries are flagged, the non-linear model may be determined to be inaccurate and adjusted. For example, the global importance value 504a for feature "F18" does not correlate with the local importance value 504b. This indicates that the non-linear model associated with non-linear model graph 500 may need to be adjusted or the feature importance model should be investigated. In some embodiments, the listed features may indicate that a single feature dominates the prediction label associated with a prediction (e.g., the feature importance value is greater than a dominance score). For example, feature F1 may have an associated importance value of 0.98 (out of 1.00). This may indicate a data leak associated with the predication and indicate that the model may need to be adjusted or the feature importance model should be investigated. In response to such an indication, the model may be adjusted or investigated.

Figure 6:
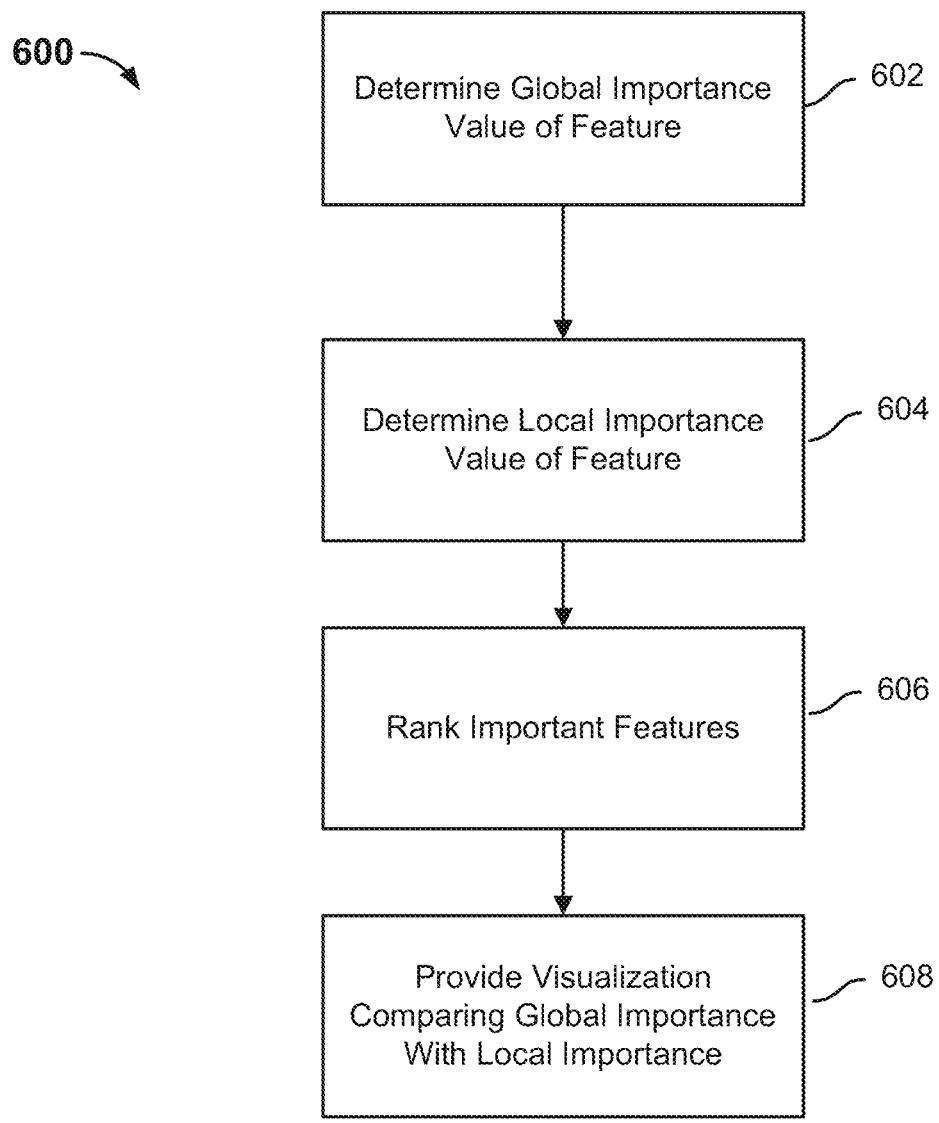
FIG. 6 is a flow chart illustrating an embodiment of a process for providing a non-linear surrogate model.

FIG. 6 is a flow chart illustrating an embodiment of a process for providing a non-linear surrogate model. In the example shown, process 600 may be implemented by a system, such as surrogate model server 112.

At 602, a global importance value of a feature is determined. The global feature importance value may be equal to the number of times in a decision tree ensemble that the feature was selected to split a decision tree of the decision tree ensemble. In some embodiments, the global feature importance value is scaled to a number between 0 and 1, such that the most important feature has an importance value of 1. In some embodiments, the global feature importance value is weighted based on a location of a feature in a decision tree. For example, a feature that is selected at the top of a decision tree for a split has a weight that is higher than another feature that is selected at the bottom of a decision tree for a split.

At 604, a local importance value of a feature is determined. The local feature importance value may be determined by computing a LOCO value for a feature. An entry is comprised of a plurality of features. A first prediction is computed using the plurality of features and a second prediction is computed using the plurality of features less one of the plurality of features. The second prediction is subtracted from the first prediction to determine the importance of the feature.

At 606, the one or more most important features are ranked. In some embodiments, the one or more important features are ranked based on the global importance values. In other embodiments, the one or more important features are ranked based on the local importance values. The top number (e.g., top 5) of features or top percentage (top 10%) of features may be determined to be the one or more most important features.

At 608, a visualization of a comparison between the determined global importance value and the determined local importance for a plurality of features is provided. In some embodiments, the comparison is provided for the one or more most important features.

Figure 7:
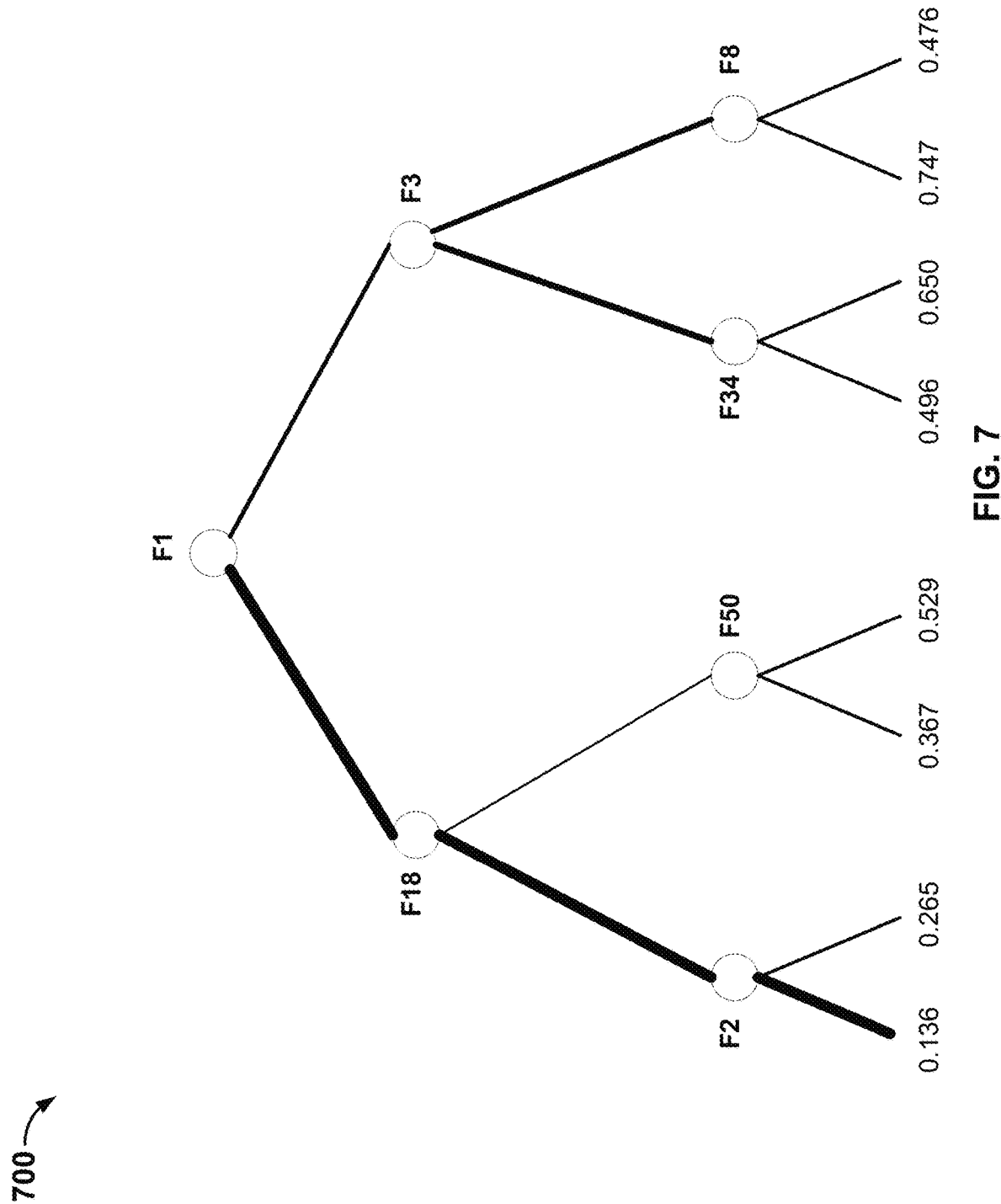
FIG. 7 is a diagram illustrating an embodiment of a non-linear surrogate model.

FIG. 7 is a diagram illustrating an embodiment of a non-linear surrogate model. Non-linear model graph 700 may be implemented by a system, such as surrogate model server 112. Non-linear model graph 700 may represent the output of a non-linear surrogate model, such as one of the non-linear surrogate models 115. A non-linear surrogate model 115 is a surrogate model of a more complex function, such as machine learning model 104.

Non-linear model graph 700 illustrates a decision tree surrogate model. A complex decision ensemble tree model may be comprised of hundreds of trees with varying degrees of complexity (e.g., 1000s of levels). The decision tree surrogate model is an approximation of the complex decision tree ensemble model (e.g., global decision tree surrogate model) and is comprised of a shallow decision tree, e.g., three levels.

Non-linear model graph 700 may indicate the most common decision path of a decision tree surrogate model. A thickness of the most common decision path may have a greater thickness than other decision paths. For example, the path between "F1", "F18," and "F2" is thicker than other decision paths. This indicates that the path between "F1", "F18," and "F2" is the most common decision path for non-linear model graph 700. Non-linear model graph 700 may indicate the least common decision path of a decision tree surrogate model. A thinness of the least common decision path may have a thinner thickness than other decision paths. For example, the patch between "F18" and "F50" is thinner than other decision paths. This indicates that the path between "F18" and "F50" is the least common decision path for non-linear model graph 700. A width of a path of the decision tree surrogate model may indicate a frequency of which the path is used by the decision tree surrogate model.

Non-linear model graph 700 may include a prediction label associated with different paths associated with the decision tree surrogate model. For example, a prediction label of "0.136" is outputted for entries with features F1, F18, and F2.

In some embodiments, when an observation (e.g., white dot in FIG. 3) is selected on a linear model graph, such as linear model graph 300, non-linear model graph 700 may be updated to show the path of the observation through the decision tree surrogate model.

Figure 8:
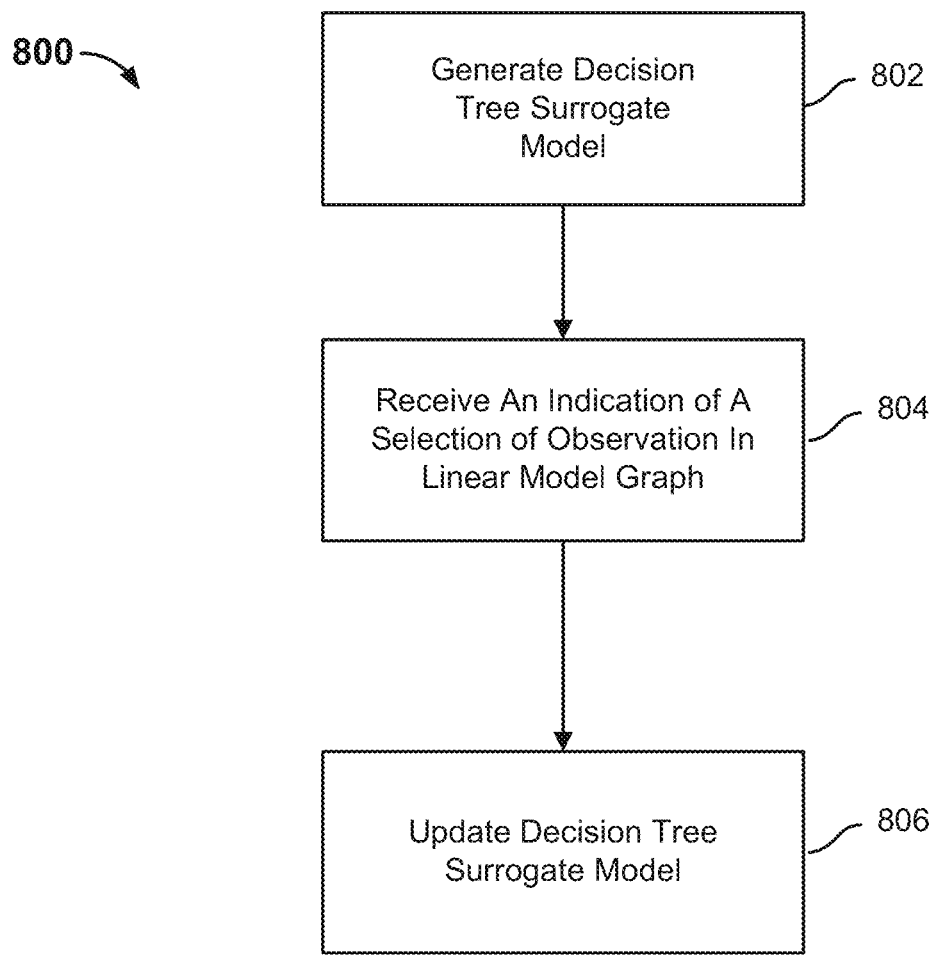
FIG. 8 is a flow chart illustrating an embodiment of a process for providing a surrogate non-linear model.

FIG. 8 is a flow chart illustrating an embodiment of a process for providing a surrogate non-linear model. In the example shown, process 800 may be implemented by a system, such as surrogate model server 112.

At 802, a decision tree surrogate model is generated. A complex decision tree model may be comprised of hundreds of trees with varying degrees of complexity (e.g., 1000s of levels). The decision tree surrogate model is an approximation of the complex decision tree model and is comprised of a shallow decision tree, e.g., three levels.

At 804, an indication of a selection of an observation point in a linear surrogate model graph is received. The linear surrogate model graph may plot the prediction labels of a linear surrogate model and a machine learning model with respect to ranked predictions. An observation point is one of the predictions made by a linear surrogate model.

At 806, the decision tree surrogate model is updated based on the selected observation point. The decision tree surrogate model may be updated to show the path of the selected observation point through the decision tree surrogate model.

Figure 9:
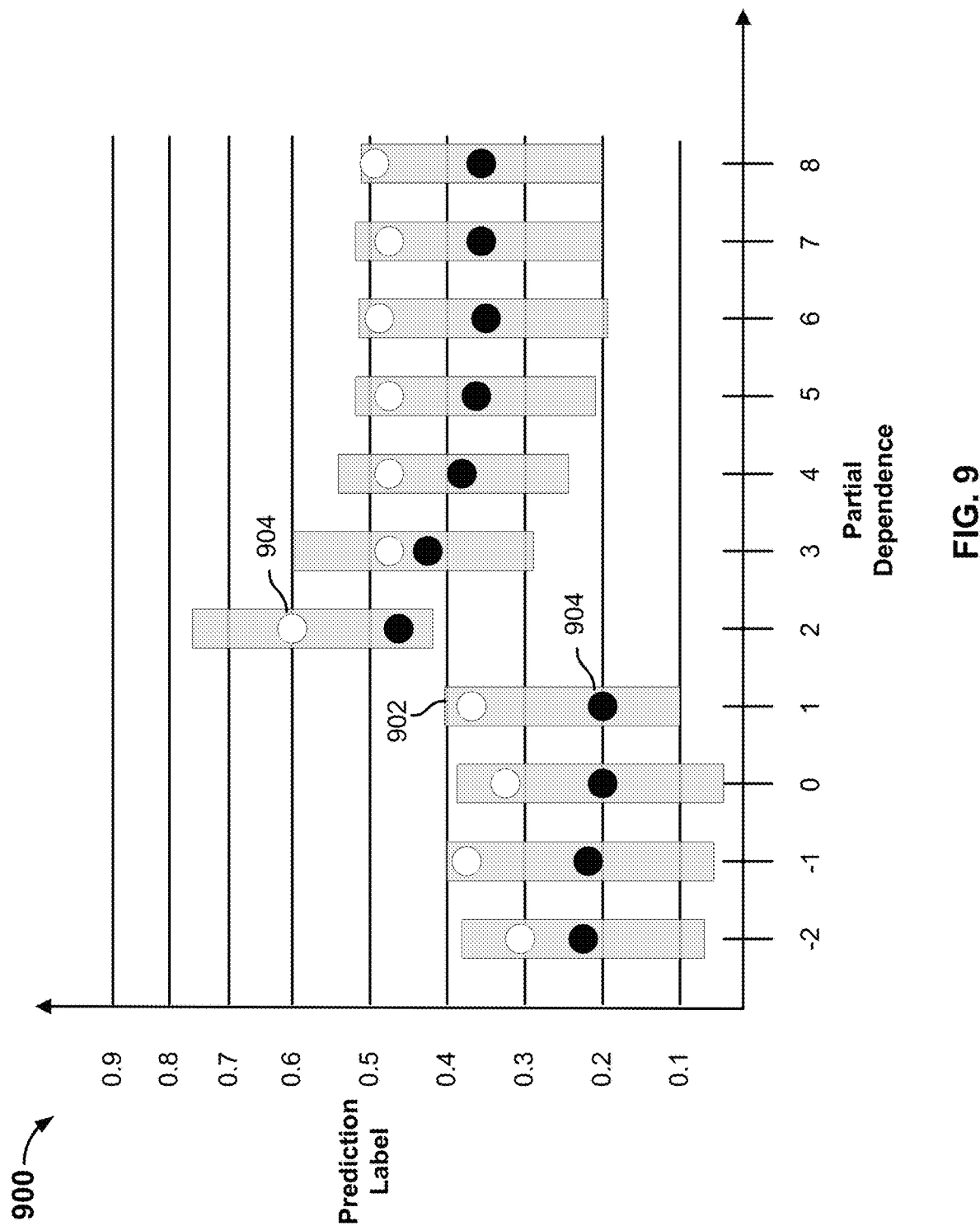
FIG. 9 is a diagram illustrating an embodiment of a non-linear surrogate model.

FIG. 9 is a diagram illustrating an embodiment of a non-linear surrogate model. Non-linear model graph 900 may be implemented by a system, such as surrogate model server 112. Non-linear model graph 900 may represent the output of a non-linear surrogate model, such as one of the non-linear surrogate models 115. A non-linear surrogate model 115 is a surrogate model of a more complex function, such as machine learning model 104.

Non-linear model graph 900 illustrates a partial dependence plot. A partial dependence plot determines the partial dependence of the prediction on a feature. A partial dependence plot is configured to modify a feature value associated with a feature to be the same value for all entries and to determine the prediction label given the modified feature value. In some embodiments, an average prediction label is determined for different feature values. For example, non-linear graph 900 illustrates white dots that may have a value ranging from "−2" to "8." The white dots depict the average prediction label for the inputs having the feature value. For example, white dot 904 indicates that the average prediction label, for all inputs having a feature value of "2" for a particular feature, is "0.6."

Non-linear model graph 900 illustrates a range of prediction labels (e.g., one standard deviation) for all entries having the same feature value. For example, range 902 indicates that a model will usually output a prediction label between 0.1 and 0.4 when the feature value for a particular feature is "1."

Non-linear model graph 900 illustrates a prediction label for an entry when a feature value is set to a particular value. For example, black dot 904 indicates that the prediction label is 0.2 when the feature value is set to "1" for the particular feature and particular entry.

Figure 10:
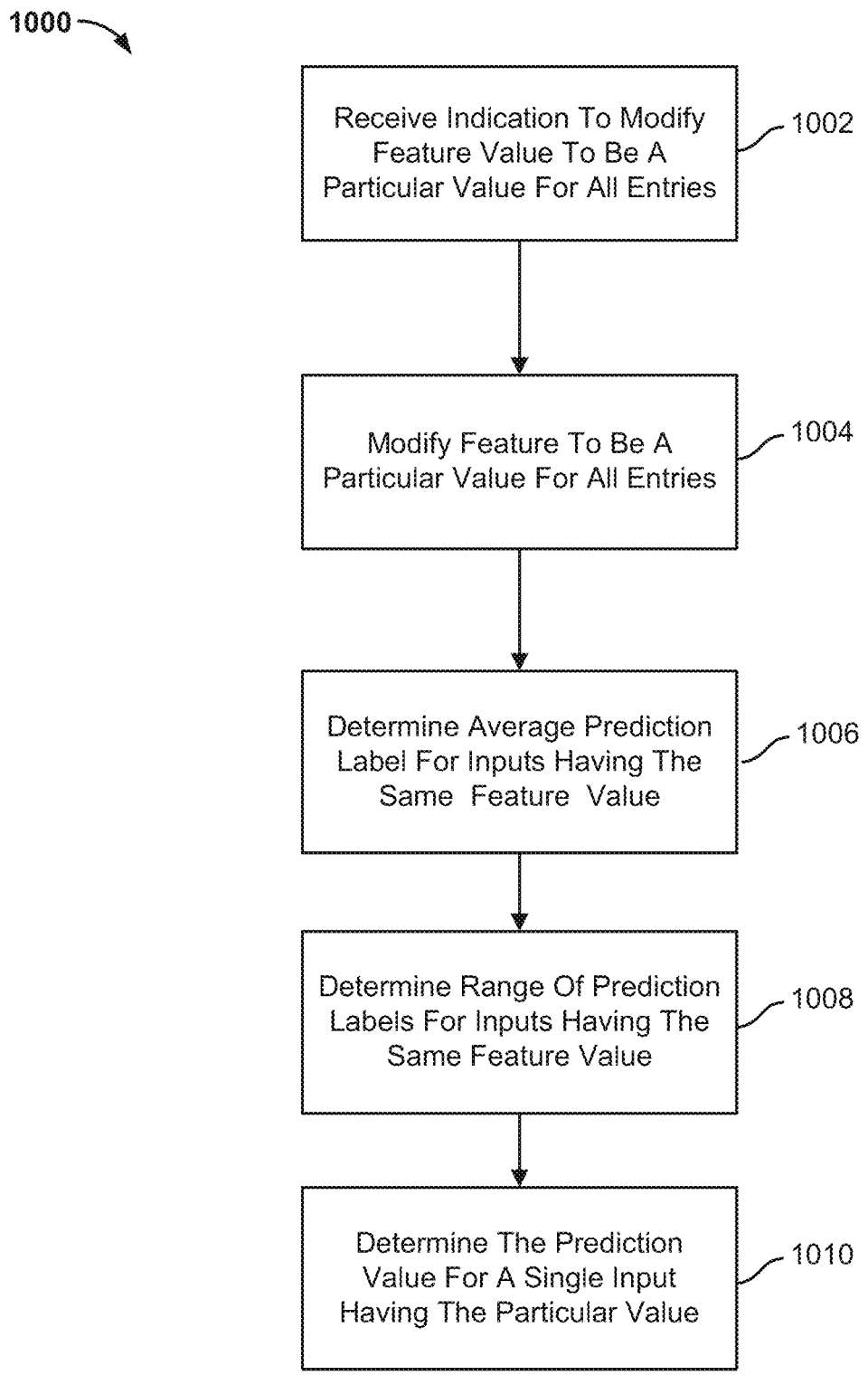
FIG. 10 is a flow chart illustrating an embodiment of a process for providing a non-linear model.

FIG. 10 is a flow chart illustrating an embodiment of a process for providing a non-linear model. In the example shown, process 1000 may be implemented by a system, such as surrogate model server 122.

At 1002, an indication to modify a feature value associated with a feature to be a particular value for all entries is received. At 1004, the feature is modified to be the particular value for all entries. An entry is comprised of one or more features having a corresponding feature value. The entry input data may indicate that the feature value for a particular feature varies for all entries. The input data may be modified such that the feature value for a particular feature is the same for all entries.

At 1004, the average prediction label for entries having the same feature value is determined. The prediction label for all entries having the particular feature with the same feature value is computed and averaged. At 1006, the range of prediction labels (e.g., one standard deviation) for entries having the same feature value is determined.

At 1008, the prediction label for a single entry having the particular feature value is determined. The single entry may correspond to a selected observation point in a linear surrogate model graph.

In some embodiments, steps 1002-1008 is repeated for all possible values for a particular feature. For example, the feature depicted in FIG. 9 has possible feature values of "−2" to "8." Steps 1002-1008 may be repeated for when the feature value is "−2," "−1," . . . "8."

Figure 11:
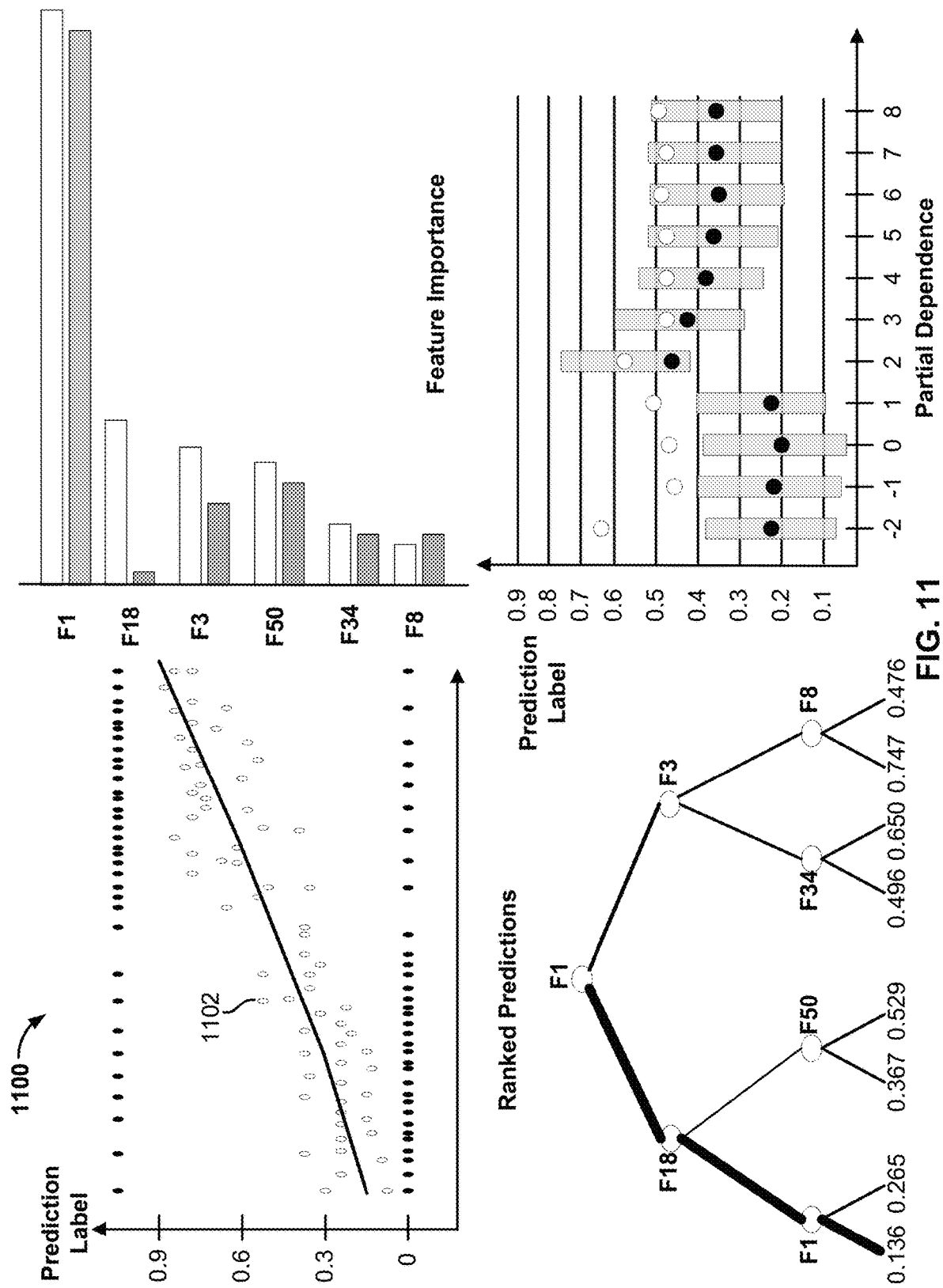
FIG. 11 is a diagram illustrating an embodiment of a dashboard.

FIG. 11 is a chart illustrating an embodiment of a dashboard. In the example shown, dashboard 1100 may be implemented by a system, such as surrogate model server 122. Dashboard 1100 may be provided to a client system, such as client 122. Dashboard 1100 may include a linear model graph and one or more non-linear model graphs, or graphs based on the original machine learning model.

In the example shown, dashboard 1100 includes a K-LIME linear model graph, a feature importance graph, a surrogate model decision tree, and a partial dependence graph. In some embodiments, a user selection of an observation, such as white dot 1102, is received. In response to the selection, the feature importance graph, the surrogate model decision tree, and the partial dependence graph may be updated.

For example, the feature importance graph may be updated to depict the most important features. The most important features may be the most important features associated with a global surrogate model. The most important features may be the most important features associated with the selected observation point. The surrogate model decision tree may be updated to reflect a path in the surrogate decision tree that the observation took to arrive at the prediction label. The partial dependence graph may be updated to depict how the prediction label for the observation point changes when the feature value of a particular feature is modified to be a particular value.

Figure 12:
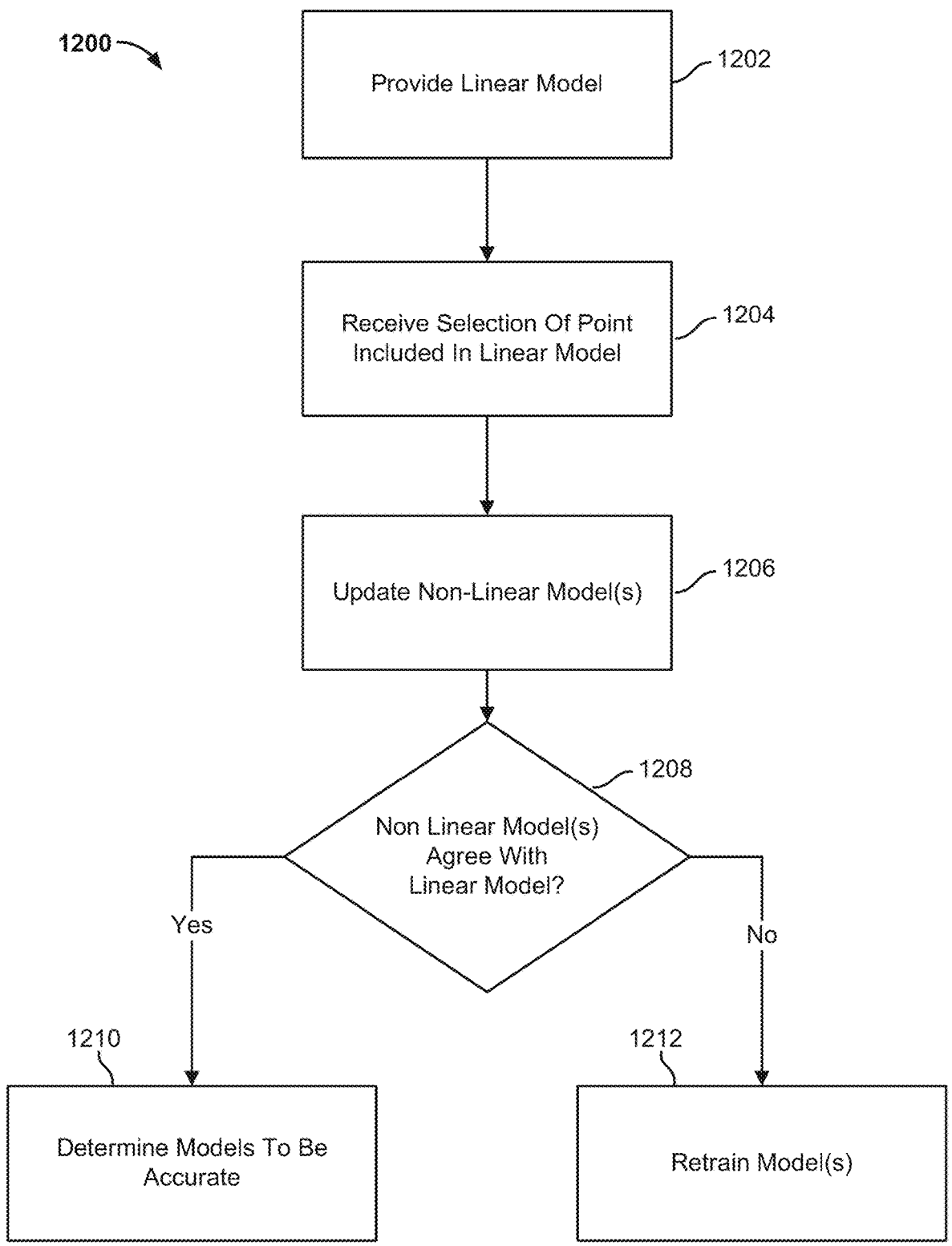
FIG. 12 is a flow chart illustrating an embodiment of a process for debugging models.

FIG. 12 is a flow chart illustrating an embodiment of a process for debugging machine learning models. In the example shown, process 1200 may be implemented by a system, such as surrogate model server 122.

At 1202, a linear model graph is provided. The linear model graph may depict the predictions of a linear surrogate model.

At 1204, a selection of a point included in the linear surrogate model is received. The linear surrogate model graph may plot the prediction labels of a linear surrogate model and a machine learning model with respect to ranked predictions. An observation point is one of the predictions made by a linear surrogate model.

At 1206, one or more non-linear surrogate models are updated based on the selected point. For example, the feature importance graph may be updated to depict the most important features. The surrogate model decision tree may be updated to reflect a path in the surrogate decision tree that the observation took to arrive at the prediction label. The partial dependence graph may be updated to depict how the prediction label for the observation point changes when the feature value of a particular feature is modified to be a particular value.

At 1208, it is determined whether an output of the linear surrogate model correlates with an output of the non-linear surrogate model. For example, an output of the linear surrogate model may indicate that feature "F1" is one of the top features that influenced the prediction label of the linear surrogate model while the output of a non-linear surrogate model indicates that feature "F1" is not one of the top features that influenced the prediction of the non-linear surrogate model.

In response to determining that the linear model agrees with the linear model, process 1200 proceeds to 1210. In response to determining that the linear model does not agree with the linear model, process 1200 proceeds to 1212.

At 1210, the linear surrogate model and/or at least one of the non-linear surrogate models are determined to be accurate. The models are determined to be accurate because the explanations are deemed to be accurate. For example, determined feature importance, decision tree surrogate model outputs, and/or a partial dependence plot remaining stable over time or when training data is intentionally perturbed may be matched with human domain expertise to debug the models. In the event the explanations match with human domain expertise, then more confidence may be attached to the models. These techniques may be used for visualizing, validating, and debugging the machine learning model by comparing the displayed decision-process, important features, and important interactions to known standards, domain knowledge, and reasonable expectations.

At 1212, the linear and/or nonlinear model(s) are retrained. In some embodiments, the linear and/or non-linear surrogate models are retrained in the event a threshold number of entries are flagged. An entry may be flagged in the event a prediction label associated with a linear surrogate model does not correlate with a prediction label associated with a non-linear surrogate model.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving an indication of a selection of an entry associated with a linear surrogate machine learning model, wherein the linear surrogate machine learning model approximates an output associated with a machine learning model;

in response to the received indication of the selection of the entry associated with the linear surrogate machine learning model, dynamically updating one or more interpretation views associated with one or more other surrogate machine learning models based on the selected entry, wherein dynamically updating one or more interpretation views associated with the one or more other surrogate machine learning models includes updating a first non-linear surrogate machine learning model comprising a feature importance model that includes corresponding global feature importance values and corresponding local importance feature values for a plurality of features;

determining whether a local feature importance value associated with the selected entry correlates with a global feature importance value associated with the selected entry;

flagging the selected entry in response to determining that the local feature importance value associated with the selected entry does not correlate with the global feature importance value associated with the selected entry, wherein the local feature importance value associated with the selected entry does not correlate with the global feature importance value associated with the selected entry in the event a difference between a first feature local feature importance value of a first feature of the plurality of features and a first feature global feature importance value of the first feature is greater than a threshold value; and in response to a threshold number of entries associated with the linear surrogate machine learning model being flagged, retraining the first non-linear surrogate machine learning model that includes the feature importance model.

2. The method of claim 1, wherein a corresponding global feature importance value for the first feature of the plurality of features indicates an importance of the first feature for a global surrogate model.

3. The method of claim 2, wherein the corresponding global feature importance value for the first feature indicates a number of times in a decision tree ensemble that the first feature was selected to split decision tree of the decision tree ensemble.

4. The method of claim 2, wherein the corresponding global feature importance value for the first feature is scaled to a number between 0 and 1.

5. The method of claim 2, wherein the corresponding global feature importance value for the first feature is weighted based on a location of the first feature in a decision tree.

6. The method of claim 1, wherein a corresponding local feature importance value for the first feature of the plurality of features indicates an importance of the first feature for the selected entry.

7. The method of claim 6, wherein the corresponding local feature importance value for the first feature is determined by computing a leave-one-covariate-out (LOCO) value for the first feature.

8. The method of claim 1, further comprising providing the first non-linear surrogate machine learning model at least in part by:
determining the corresponding global feature importance values for the plurality of features; and
determining the corresponding local importance feature values for the plurality of features.

9. The method of claim 1, further comprising ranking the plurality of features.

10. The method of claim 9, wherein the plurality of features is ranked based on their corresponding global feature importance values.

11. The method of claim 9, wherein the plurality of features is ranked based on their corresponding local feature importance values.

12. The method of claim 9, further comprising providing a visualization of the ranking of the plurality of features.

13. The method of claim 12, wherein the visualization includes a top number of the plurality of features.

14. The method of claim 12, wherein the visualization includes a top percentage of the plurality of features.

15. A system, comprising:
a processor configured to:
receive an indication of a selection of an entry associated with a linear surrogate machine learning model, wherein the linear surrogate machine learning model approximates an output associated with a machine learning model;
in response to the received indication of the selection of the entry associated with the linear surrogate machine learning model, dynamically update one or more interpretation views associated with one or more other surrogate machine learning models based on the selected entry, wherein to dynamically update one or more interpretation views associated with the one or more other surrogate machine learning models, the processor is configured to update a first non-linear surrogate machine learning model comprising a feature importance model that includes corresponding global feature importance values and corresponding local importance feature values for a plurality of features;
determine whether a local feature importance value associated with the selected entry correlates with a global feature importance value associated with the selected entry;
flag the selected entry in response to determining that the local feature importance value associated with the selected entry does not correlate with the global feature importance value associated with the selected entry, wherein the local feature importance value associated with the selected entry does not correlate with the global feature importance value associated with the selected entry in the event a difference between a first feature local feature importance value of a first feature of the plurality of features and a first feature global feature importance value of the first feature is greater than a threshold value; and
in response to a threshold number of entries associated with the linear surrogate machine learning model being flagged, retrain the first non-linear surrogate machine learning model that includes the feature importance model; and
a memory coupled to the processor and configured to provide the processor with instructions.

16. The system of claim 15, wherein a global feature importance value for the first feature of the plurality of features indicates an importance of the first feature for a global surrogate model.

17. The system of claim 15, wherein a local feature importance value for the first feature of the plurality of features indicates an importance of the first feature for the selected entry.

18. The system of claim 15, wherein the processor is configured to rank the plurality of features.

19. The system of claim 18, wherein the processor is further configured to provide a visualization of the ranking of the plurality of features.

20. A computer program product, the computer program product being embodied in a non-transitory computer readable storage medium and comprising computer instructions for:
receiving an indication of a selection of an entry associated with a linear surrogate machine learning model, wherein the linear surrogate machine learning model approximates an output associated with a machine learning model;
in response to the received indication of the selection of the entry associated with the linear surrogate machine learning model, dynamically updating one or more interpretation views associated with one or more other surrogate machine learning models based on the selected entry, wherein dynamically updating one or more interpretation views associated with the one or more other surrogate machine learning models includes updating a first non-linear surrogate machine learning model comprising a feature importance model that includes corresponding global feature importance values and corresponding local importance feature values for a plurality of features;
determining whether a local feature importance value associated with the selected entry correlates with a global feature importance value associated with the selected entry;

flagging the selected entry in response to determining that the local feature importance value associated with the selected entry does not correlate with the global feature importance value associated with the selected entry, wherein the local feature importance value associated with the selected entry does not correlate with the global feature importance value associated with the selected entry in the event a difference between a first feature local feature importance value of a first feature of the plurality of features and a first feature global feature importance value of the first feature is greater than a threshold value; and in response to a threshold number of entries associated with the linear surrogate machine learning model being flagged, retraining the first non-linear surrogate machine learning model that includes the feature importance model.

* * * * *